Patented Apr. 14, 1942

2,279,451

UNITED STATES PATENT OFFICE 2,279,451

ELECTRIC BLASTING INITIATOR

Myrle Hardt English, Pompton Lakes, N. J., and Roland Roswell Nydegger, Wilmington, Del., assignors to E. I. du Pont de Nemours & Company, Wilmington, Del., a corporation of Delaware Application November 9, 1939, Serial No. 303,570

4 Claims. (Cl. 102—10)

This invention relates to the art of electric blasting initiators.

As is well known, the firing circuit in the electric blasting initiator is completed by connecting a bridge wire of high resistance and extremely small diameter between the ends of the leg wires. For instance, in the bridge plug type of initiator the bridge wire is connected to the ends of the bridge posts, which are the terminations of the leg wires which extend below the base of the bridge plug.

In the past, the bridge wires have usually been soldered in place. Some attempts, indeed, have been made to weld the same in place by providing V-shaped notches in the bridge posts. However, none of these methods have been satisfactory.

The object of our invention is to improve the method of securing the bridge wire in place, as well as to improve the completed blasting cap by providing better connections between the bridge wire and the ends of the leg wires. Further objects will be apparent from the following detailed description of our invention.

We have found that the foregoing objects are accomplished by electrically welding the bridge wire of extremely small diameter to the end of the leg wire while confining said bridge wire in a metal sandwich. By the term "metal sandwich" we mean that the bridge wire is wedged between the bridge post and a separate and distinct metal unit, preferably in the form of a strip of metal sheeting.

We prefer to carry out our invention as follows: The bridge posts are cleaned and placed in a small welding jig. The bridge wire is passed across the bridge posts and also secured to the welding jig. A strip of tin-iron sheeting $\frac{1}{32}$" wide is then placed on top of the bridge wire and held down with an electric welding tip. An ordinary welding current is passed through this sandwich, securing together the bridge post, the bridge wire, and the tinned-iron strip. The process is preferably repeated for the second bridge post by indexing the welding jig to locate the second bridge post under the welding tips. Our invention may be understood more readily by referring to the accompanying drawing, which sets forth a preferred embodiment of the same. Similar numerals refer to corresponding parts throughout the several figures thereof.

Figure 1 is a view in cross-section of a bridge plug type of assembly as employed in electric blasting initiators. Figure 2 is a similar view of said bridge plug assembly in place in the complete initiator assembly. Figure 3 is a view in perspective of a slightly different type of bridge plug assembly, showing the sandwich weld at an angle. Figure 4 is a side view showing a sandwich weld horizontally disposed.

In greater detail, numeral 1 represents the bridge plug through which are passed the leg wires 2. The wires terminate in the bridge posts 3, which extend beyond the base of the plug. These bridge posts are joined by the bridge wire 4, which is held in place against each bridge post by a metal sandwich 5. The bridge plug closes the mouth of the shell 7, which is charged with explosive composition 6.

While we do not intend to be limited thereto, we greatly prefer to employ a bi-metal sandwich. In other words, when the bridge posts to be employed are composed of iron wire, the strip material for completing the sandwich is preferably copper, while iron stripping is preferably employed with bridge posts of copper wire.

While we have described our invention particularly with reference to the joining of the small diameter high resistance bridge wire to the bridge post in the manufacture of electric blasting initiators, it should be understood that the metal sandwich welding method of the invention is applicable as well to any problem in which a small diameter high resistance wire is to be joined with a wire of larger diameter and/or lower resistance. For instance, the bridge wire commonly employed in electric blasting initiators is of the order of magnitude of .0015" in diameter, while the wire forming the bridge post is of the order of magnitude of .025" in diameter. The top of the finished sandwich is approximately $\frac{1}{64}$ of an inch by $\frac{1}{32}$ of an inch in size. It will be appreciated that similar problems of joining a small diameter high resistance wire to the wire of larger diameter are involved in the manufacture of radio tubes and like devices. Accordingly, we do not wish to be limited to electric blasting initiators alone in the use of the method and juncture of our invention. The process of our invention is broadly applicable to any problem of this nature.

The welding apparatus employed may be a conventional, mechanical spot-welding unit. The current regulation may be obtained with a conventional solenoid dash-pot type of timer which gives only approximately similar welding cycles. This is important only in so far as it indicates that the welding cycle is not a critical one as in most fine wire welding. It should be understood, therefore, that the success of the weld of our invention lies in its own structure and need not be associated in any way with specific types of welding equipment.

Many advantages accrue from the bridge wire held by the metal sandwich weld according to our invention. The electric blasting initiator provided with such a sandwich weld is not subject to deterioration from corrosion in the locus of the firing circuit as is sometimes the case with soldered bridge wires. Furthermore, the structure of the bridge posts themselves is not altered or weakened in any way by the metal sandwich of our invention, in contrast to methods involving the notching of ends of the bridge posts and the like. The metal sandwich weld is highly advantageous for the reason that it may be readily adapted to the mechanical assembly of the electric blasting initiators. An absolutely firm juncture with assured perfection of electrical connection is obtainable by means of our invention.

It is to be understood that while we have described our invention in the foregoing in detail, in connection with a specific embodiment thereof, we do not intend to be limited thereto. Our invention includes within its scope any variation thereof which would suggest itself to a skilled artisan. For instance, we have described in detail only copper-iron sandwiches; yet any metal-conducting sandwich may be employed. We intend to be limited therefore only by the following patent claims.

We claim:

1. In an electric blasting initiator including bridge posts, a bridge wire suspended between said bridge posts, and an explosive charge adjacent to said bridge wire, junctures between the bridge wire and each of the bridge posts, wherein the bridge wire is disposed between the bridge post and a separate and distinct metal unit, comprising a strip of metal sheeting, said junctures being completed by a weld which holds together the bridge posts, bridge wire, and metal unit.

2. An electric blasting initiator including bridge posts and a bridge wire suspended between them, wherein the bridge wire is joined to each bridge post by a welded juncture which includes the post, the wire, and a unit of metal sheeting.

3. An electric blasting initiator according to claim 2, wherein the bridge posts comprise copper and the separate strip of metal sheeting comprises iron.

4. An electric blasting initiator according to claim 2, wherein the bridge posts comprise iron and the separate strip of metal sheeting comprises copper.

MYRLE HARDT ENGLISH.
ROLAND ROSWELL NYDEGGER.